United States Patent
Shukla et al.

(10) Patent No.: US 9,979,632 B2
(45) Date of Patent: *May 22, 2018

(54) AVOIDING DATA TRAFFIC LOSS IN A RING MULTIHOMED, IN AN ACTIVE-STANDBY MANNER, TO A TRANSPORT NETWORK

(71) Applicant: Juniper Networks, Inc., Sunnyvale, CA (US)

(72) Inventors: Pankaj Shukla, San Jose, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/000,803

(22) Filed: Jan. 19, 2016

(65) Prior Publication Data

US 2016/0134517 A1    May 12, 2016

Related U.S. Application Data

(63) Continuation of application No. 13/618,900, filed on Sep. 14, 2012, now Pat. No. 9,264,348.

(51) Int. Cl.
*H04L 12/707* (2013.01)
*H04L 12/721* (2013.01)
(Continued)

(52) U.S. Cl.
CPC ............ *H04L 45/22* (2013.01); *H04L 12/437* (2013.01); *H04L 12/4641* (2013.01);
(Continued)

(58) Field of Classification Search
None
See application file for complete search history.

(56) References Cited

U.S. PATENT DOCUMENTS

2009/0052317 A1* 2/2009 Takagi .................... H04L 41/12
370/223
2009/0147672 A1* 6/2009 Chun .................... H04L 12/437
370/225

(Continued)

FOREIGN PATENT DOCUMENTS

CN          101662421 A     3/2010
EP           2320610 A1     5/2011

OTHER PUBLICATIONS

First Office Action to Chinese Patent Application Serial No. 201310163485.1, dated Apr. 25, 2016 (6pgs.) with translation (7pgs.).

(Continued)

*Primary Examiner* — Yemane Mesfin
*Assistant Examiner* — Peter Chen
(74) *Attorney, Agent, or Firm* — John C. Pokotylo

(57) ABSTRACT

Data traffic loss in a an Ethernet Ring that is multihomed, in an active-standby manner, to a VPLS transport network (such as a Border Gateway Protocol (BGP) multihomed Ethernet Ring, an MC-LAG multihomed Ethernet Ring, or some other type of active-standby multihomed Ethernet Ring, etc.) (ring) is avoided. The exemplary multihomed ring running Ethernet Ring Protection (ERP) protocol includes a Ring Protection Link (RPL), a first node and a second node linked with a designated border router and a standby border router of the network, respectively. The data traffic loss in the multihomed ring is avoided by (i) receiving an indication that the link between the first node and the designated border router has failed; and (ii) invoking, responsive to the received indication, an ERP Media Access Control (MAC)-flush in the ring, even in the absence of a failed link in the ring and without activating the specified RPL. The ERP MAC-flush causes subsequent data packets (Continued)

from each of the plurality of nodes in the ring to be forwarded to the standby border router via the second node.

21 Claims, 9 Drawing Sheets

(51) Int. Cl.
  *H04L 12/715* (2013.01)
  *H04L 12/703* (2013.01)
  *H04L 12/723* (2013.01)
  *H04L 12/437* (2006.01)
  *H04L 12/46* (2006.01)

(52) U.S. Cl.
  CPC .............. *H04L 45/04* (2013.01); *H04L 45/28* (2013.01); *H04L 45/50* (2013.01); *H04L 45/66* (2013.01)

(56) References Cited

U.S. PATENT DOCUMENTS

| | | | | |
|---|---|---|---|---|
| 2010/0315946 | A1* | 12/2010 | Salam | H04L 12/437 370/222 |
| 2011/0158241 | A1* | 6/2011 | Wang | H04L 12/42 370/395.53 |
| 2013/0021901 | A1* | 1/2013 | Ding | H04L 12/437 370/225 |
| 2013/0235876 | A1* | 9/2013 | Sajassi | H04L 41/12 370/401 |

OTHER PUBLICATIONS

Second Office Action to Chinese Patent Application Serial No. 201310163485.1, dated Jan. 11, 2017 (7 pgs.) with partial translation (3pgs.).

* cited by examiner

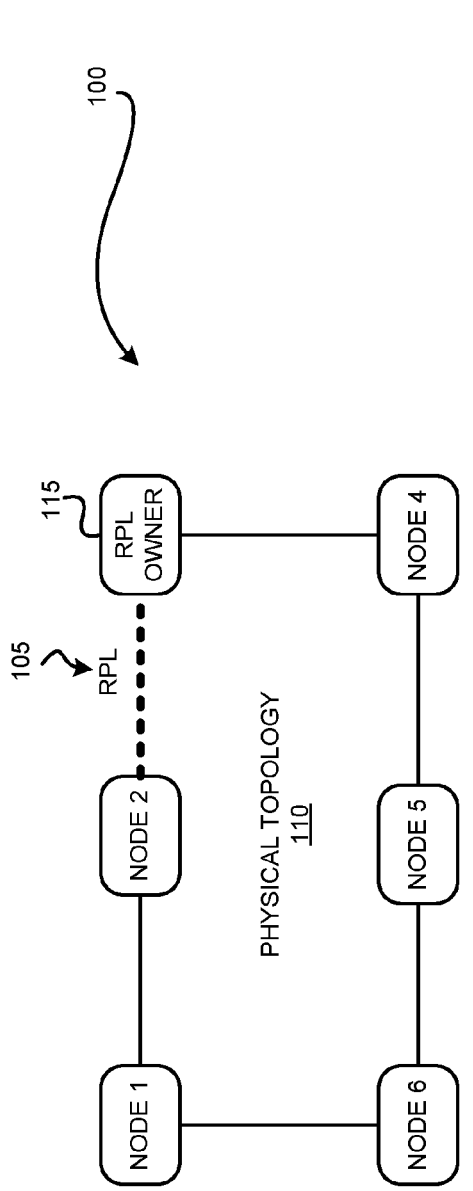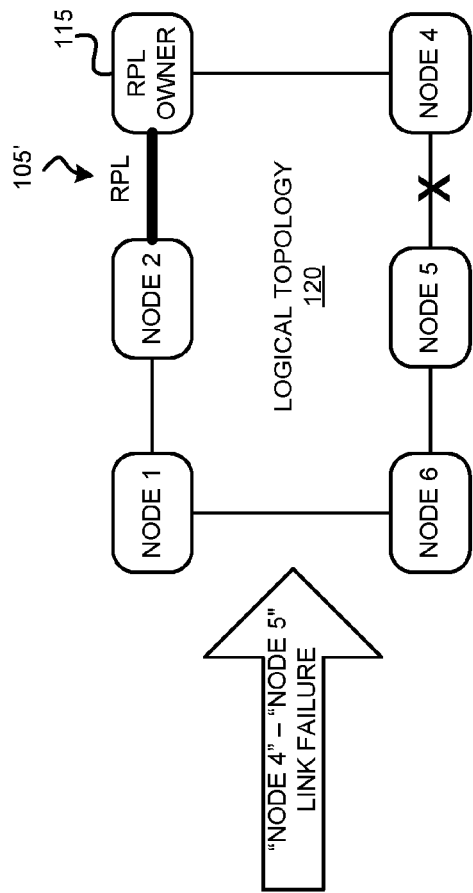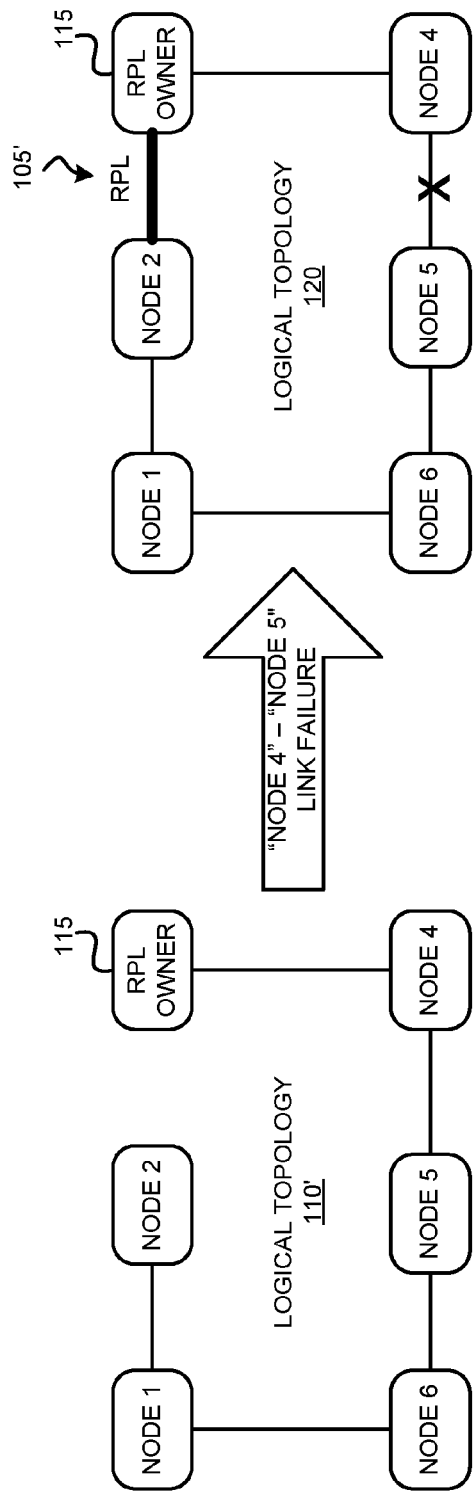

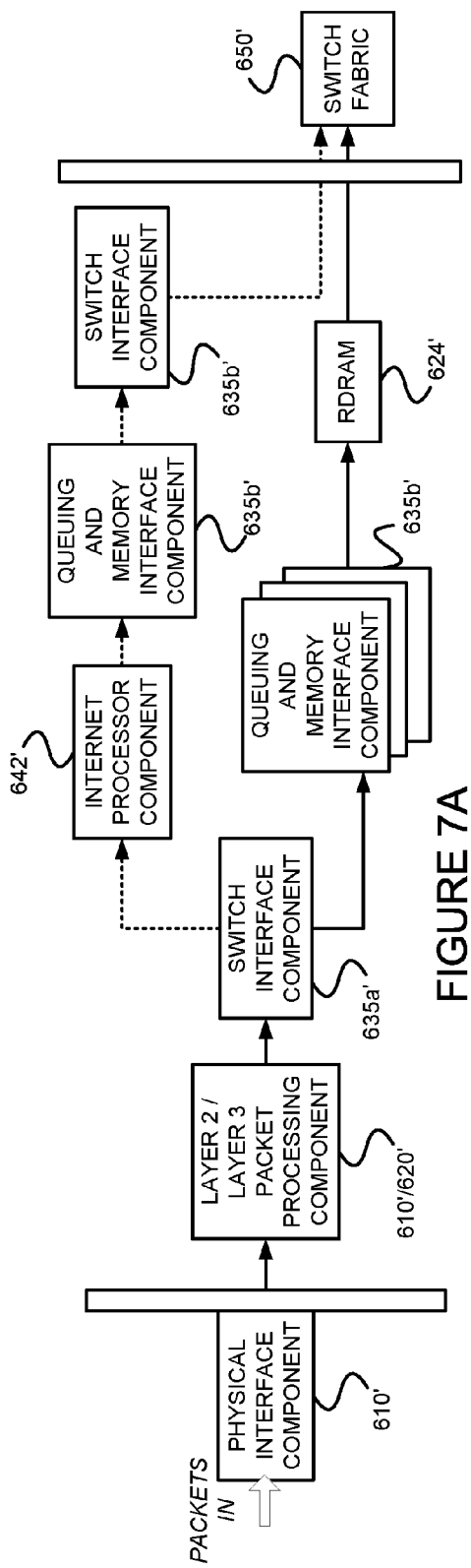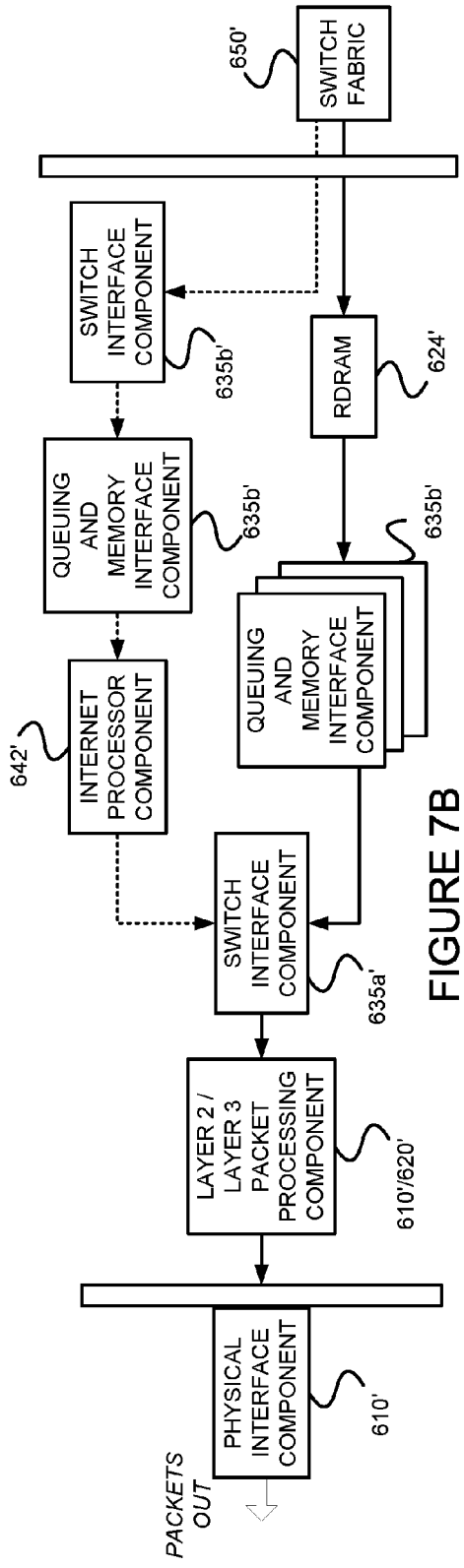

AVOIDING DATA TRAFFIC LOSS IN A RING MULTIHOMED, IN AN ACTIVE-STANDBY MANNER, TO A TRANSPORT NETWORK

§ 0. RELATED APPLICATIONS

This application is a continuation of U.S. patent application Ser. No. 13/618,900 (referred to as "the '900 application" and incorporated herein by reference), filed on Sep. 14, 2012, which issued as U.S. Pat. No. 9,264,348 on Feb. 16, 2016, titled "AVOIDING DATA TRAFFIC LOSS IN AN ETHERNET RING MULTIHOMED, IN AN ACTIVE-STANDBY MANNER, TO A VIRTUAL PRIVATE LAN SERVICE TRANSPORT NETWORK," and listing Pankaj SHUKLA and Sunesh RUSTAGI as the inventors. The scope of the present invention is not limited to any requirements of the specific embodiments described in the '900 application.

§ 1. BACKGROUND OF THE INVENTION

§ 1.1 Field of the Invention

The present invention concerns avoiding data traffic loss in an Ethernet Ring multihomed, in an active-standby manner, to a virtual private LAN service (VPLS) transport network. Thus, the present invention may be used, for example, to prevent data losses in Border Gateway Protocol (BGP) multihomed Ethernet Rings, multi-chassis-lag (MC-LAG) multihomed Ethernet Rings, and other types of active-standby multihomed Ethernet Rings.

§ 1.2 Background Information

§ 1.2.1 Network Communications Protection Using Rings

Link failure may often be an unavoidable part of networking. However, there are techniques for improving the reliability of a router or bridge network even when link failures occur. For example, SONET/SDH seal-healing rings may be used to add a level of robustness to communications networks. Such ring protection switching has been extended to Ethernet links. Ethernet Ring Protection (ERP) may be configured for a series of two or more systems so that if one link fails, traffic is rerouted around the failure on the Ethernet Ring (ring). ERP switching architectures avoid loops, and use learning, forwarding, and Filtering Database (FDB) mechanisms. Each of these aspects of ERP switching architectures are introduced below.

Loop avoidance in the ring may be achieved by permitting data traffic flow on all but one of the links in the ring, at any point in time. The particular link avoided may be referred to as the Ring Protection Link (RPL). Under normal conditions this RPL may be blocked or otherwise disabled (i.e., not used for data traffic). A designated ring node, referred to as the RPL Owner Node, may be responsible for blocking traffic through the RPL under normal conditions. Under a ring failure condition, the RPL Owner Node is responsible for unblocking (i.e., activating) the RPL (unless the RPL has failed), allowing the RPL to be used for data traffic.

Thus, ERP uses one specific link (for example, the RPL) to protect the whole ring. As illustrated in FIG. 1A, the example Ethernet Ring 100 includes an RPL 105 to protect it. When all links in the ring are up and active, data traffic through the RPL 105 is blocked. Therefore, the RPL 105 remains idle. Referring to FIGS. 1A and 1B, although the physical topology 110 of the Ethernet Ring 100 includes a physical RPL 105, in the logical topology 110' of Ethernet Ring 100, the RPL 104 is not seen between "Node 2" and the "RPL Owner" node 115. FIG. 1B illustrates the condition of the RPL being idle, under which no data traffic is allowed to pass through the RPL. In this example, the RPL 105 is controlled by a designated RPL owner node 115. The RPL owner node 115 may be responsible for blocking the RPL under normal operating conditions.

Referring to FIG. 1C, if a link failure occurs on the ring (e.g., if the link between Nodes 4 and 5 fails), the RPL owner node 115 automatically protects the ring by unblocking the RPL 105 so that the data traffic can be forwarded on an alternate path around the ring. For example, as shown in logical topology 120 of Ethernet Ring 100 in FIG. 1C, when the link between "Node 4" and "Node 5" fails, the RPL 105 is activated by the "RPL Owner" node 115 and data traffic is allowed to pass through the RPL 105. If the link between "Node 4" and "Node 5" recovers from failure, the RPL owner node 115 may, responsive to this recovery, revert the ring to the normal condition (Recall logical topology 110' of FIG. 1B.) by deactivating the RPL 105 and blocking the data traffic through the RPL 105.

Enhanced ring protection (ERP) works on the basis of a filtering data base (FDB) flush. More specifically, upon protection switching for a failure or a failure recovery (that is, when the ring switches from normal condition to failure condition, or vice-versa) all nodes of the ring remove all learned Media Access Control (MAC) addresses in their FDBs for a changed ring topology. Then, each ring node of the ring may broadcast data frames until MAC address learning of nodes of a newly configured ring is completed.

§ 1.2.2 Network Communications Protection Using Multihoming

"Multihoming" is a technique used to increase the reliability of an Internet connection for an IP network. There are various techniques that provide active-standby multihoming of an Ethernet Ring to a VPLS transport network. As one example, Border Gateway Protocol (BGP) multihoming enables a customer site to be connected with a service provider network via two or more peer Provider Edge (PE) routers (for example, border routers running BGP). Multi-Chassis-Lag (MC-LAG) is another example of a VPLS multihoming technique that provides Active-Standby multihoming. In either case (or in some other type active-standby multihoming of an Ethernet Ring to a transport network), the service provider may be a network that provides Virtual Private LAN Service (VPLS), for example. Connecting the customer site to two or more Provider Edge (PE) routers provides redundant connectivity that maintains the VPLS and traffic forwarding to and from the multihomed site in the event of PE router-to-Consumer Edge (CE) device link failure, the failure of a PE router, the failure of a CE device, or a Multi Protocol Label Switching (MPLS) reachability failure between a local PE router and a remote PE router. A redundant (backup) CE device-to-PE edge router path may begin providing service to the customer site responsive to the detection of one of the foregoing failures.

§ 1.2.3 Challenges Protecting Network Communications when an Ethernet Protection Ring Uses Multihoming Referring to FIG. 2, consider an architecture 200 in which a customer site 205 accesses PE routers 230 and 235 via CE routers CE 1 and CE 2 that are arranged in an Ethernet Protection Ring topology 265. More specifically, in the example architecture 200, the customer site 205 may be multihomed by connecting one of the CE routers (e.g., CE 1, referred to as a first node) in the Ethernet Ring to a primary PE router (e.g., PE 1 230) and another one of the CE routers (e.g., CE 2, referred to as a second node) to a standby PE router (e.g., PE 2 235). Under such an arrangement, a failure of the link between the primary PE router and the first node CE router (CE 1-PE 1) will not cause the Ethernet Ring to switch to a mode in which a protection link is activated because there is no failure sensed in the Ethernet Ring. As an unfortunate consequence, the Ethernet Ring likely will not forward the data traffic to the second CE router, which is connected to the standby PE router (PE 2 235). This may cause "black holing" of the data packets sent to the primary PE router. That is, the data packets may be lost or dropped without the sender knowing.

In view of the foregoing, it would be useful to extend ERP to an Ethernet Ring that is multihomed, in an active-standby manner, to a VPLS transport network (such as to a BGP multihomed Ethernet Ring, an MC-LAG multihomed Ethernet Ring, or some other type of active-standby multihomed Ethernet Ring, etc.) that protects both the Ethernet Ring and the connection to the service provider (e.g., providing a VPLS), thereby avoiding data traffic loss in the multihomed Ethernet Ring.

§ 2. SUMMARY OF THE INVENTION

Exemplary embodiments consistent with the present invention extend Ethernet Ring Protection (ERP) to an Ethernet Ring that is multihomed, in an active-standby manner, to a VPLS transport network (such as a Border Gateway Protocol (BGP) multihomed Ethernet Ring, an MC-LAG multihomed Ethernet Ring, or some other type of active-standby multihomed Ethernet Ring, etc.) such that data traffic loss in the multihomed Ethernet Ring is avoided. Such exemplary embodiments may avoid data traffic loss in the multihomed Ethernet Ring running an Ethernet Ring Protection (ERP) protocol including a specified Ring Protection Link (RPL), in which a first node of the Ethernet Ring in a first portion of a network is linked with a designated border router of a second portion of the network and in which a second node of the Ethernet Ring in the first portion of the network is linked with a standby border router of the second portion of the network, by (i) receiving an indication that the link between the first node and the designated border router of the network has failed; and (ii) invoking, responsive to the received indication, an ERP Media Access Control (MAC)-flush in the Ethernet Ring, even in the absence of a failed link in the Ethernet Ring, and without activating the specified RPL.

In at least some example embodiments consistent with the present invention, the ERP MAC-flush causes subsequent data packets from each of the plurality of nodes in the Ethernet Ring to be forwarded to the standby border router via the second node.

In at least some example embodiments consistent with the present invention, each of the plurality of nodes in the Ethernet Ring is a router.

In at least some exemplary embodiments consistent with the present invention, the first portion of the network is an access portion of a transport network and the second portion of the network is a core portion of the transport network. In at least some example embodiments consistent with the present invention, the core portion of the transport network provides a Virtual Private Local Area Network Service (VPLS) to a customer that accesses the access network via a node of the Ethernet Ring.

§ 3. BRIEF DESCRIPTION OF THE DRAWINGS

FIGS. 1A-1C illustrate an exemplary Ethernet Ring running an Ethernet Ring Protection (ERP) protocol.

Figure 3:
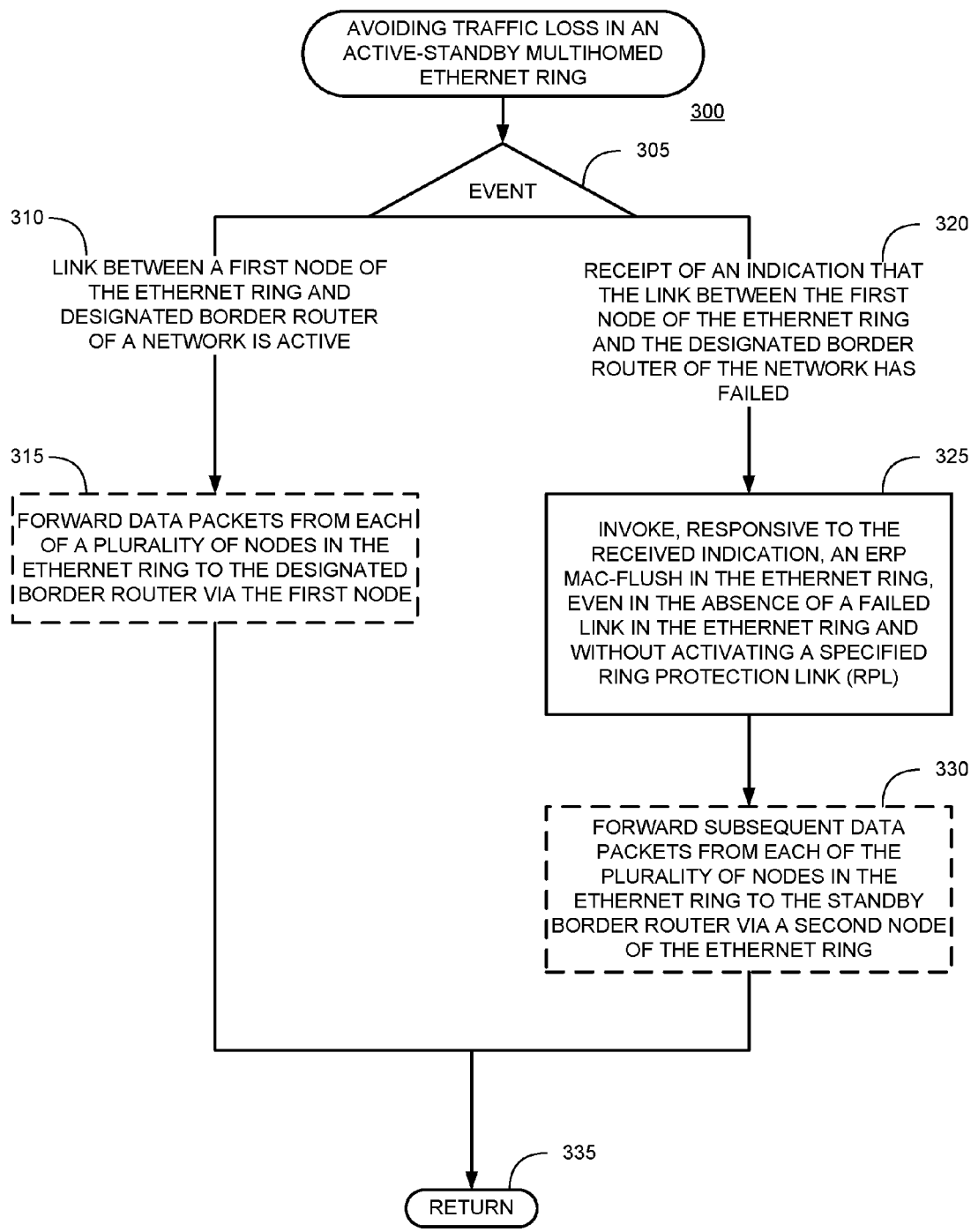

FIG. 3 is a flow diagram of an example method for avoiding data traffic loss by extending ERP to an Ethernet Ring that is multihomed, in an active-standby manner, to a VPLS transport network (such as to a Border Gateway Protocol (BGP) multihomed Ethernet Ring, to an MC-LAG multihomed Ethernet Ring, or to some other type of active-standby multihomed Ethernet Ring, etc.) in a manner consistent with the present invention.

Figure 4:
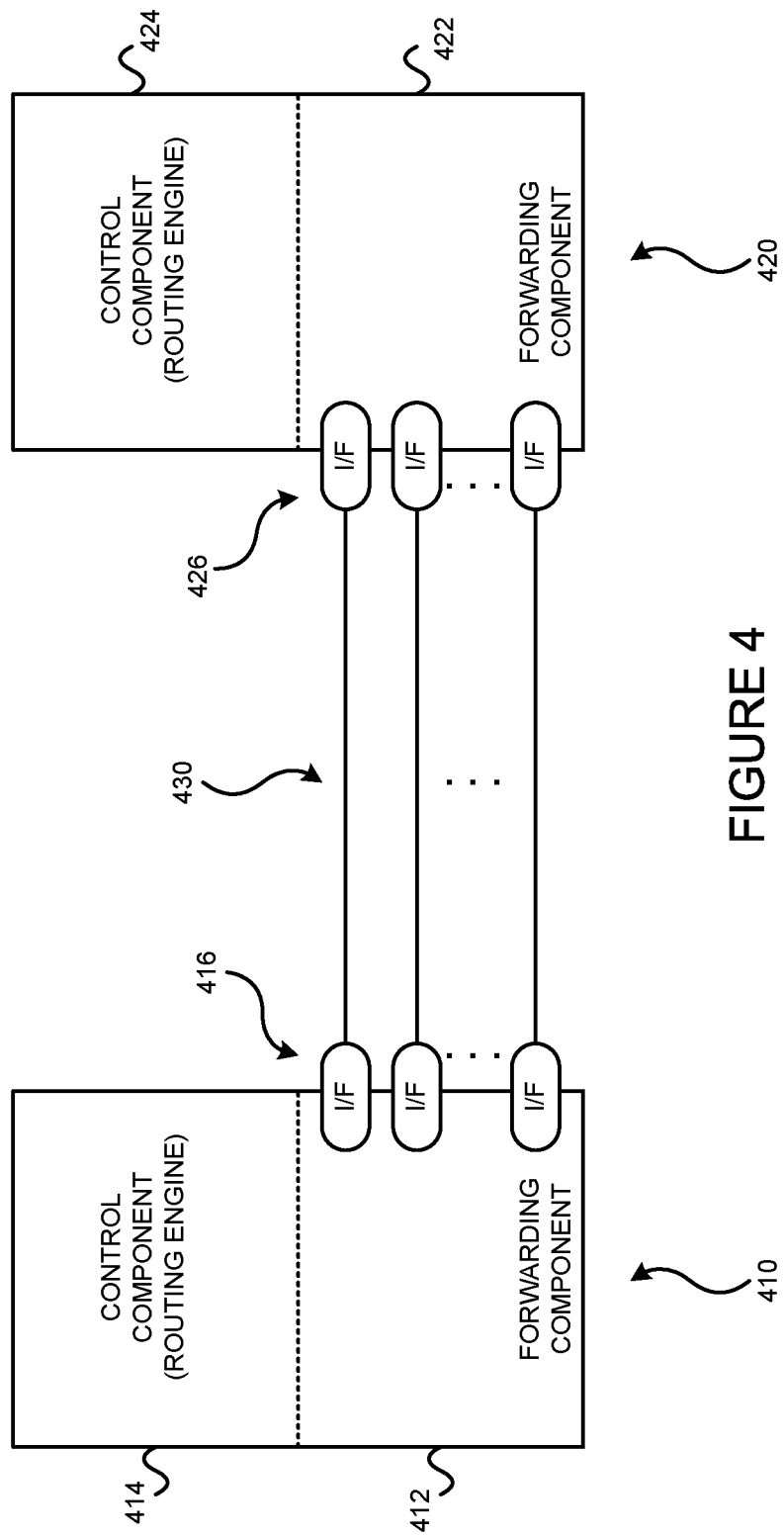

FIG. 4 illustrates an environment including two systems coupled via communications links.

Figure 5:
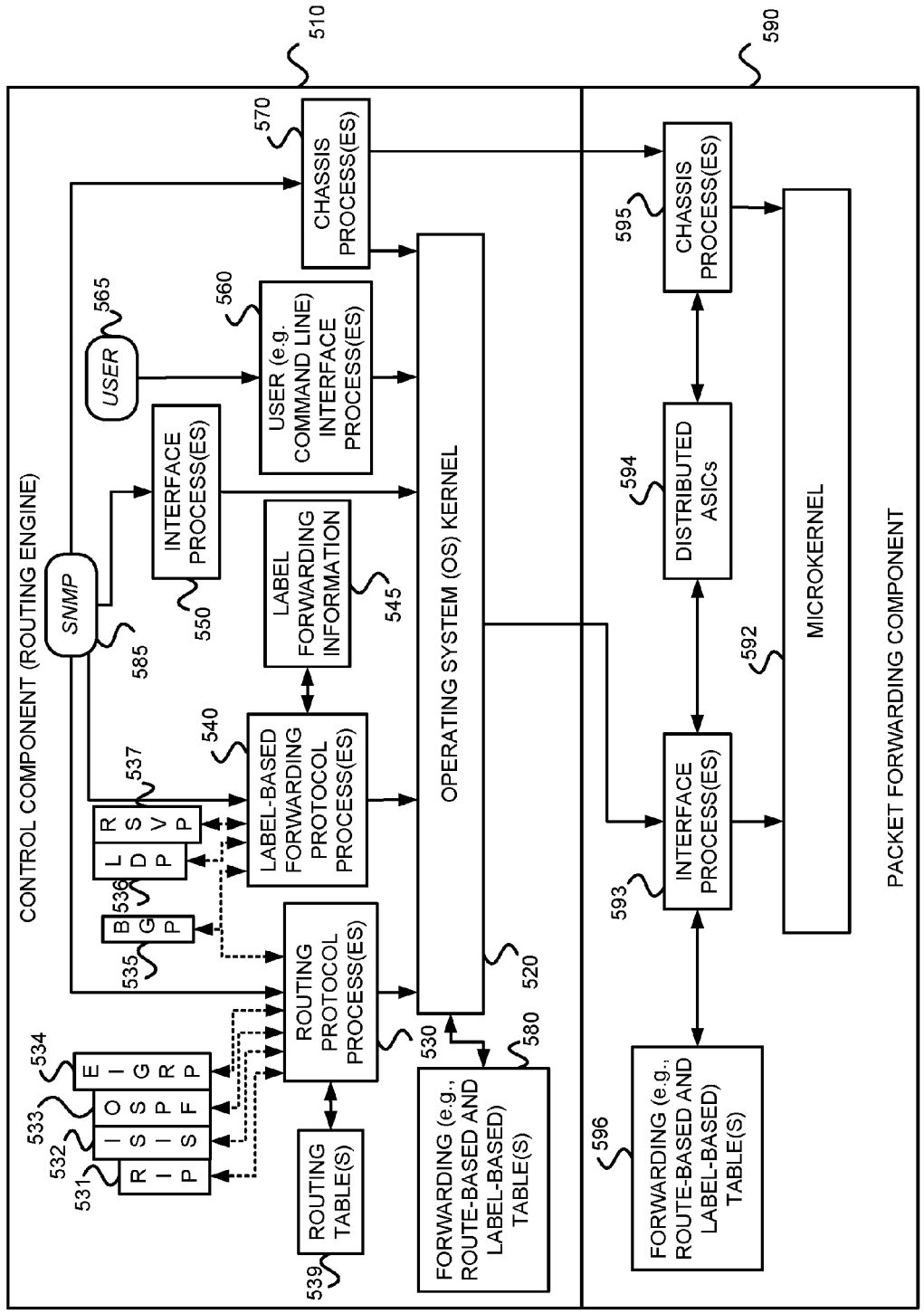

FIG. 5 is a block diagram of an example router on which the present invention may be implemented.

Figure 6:
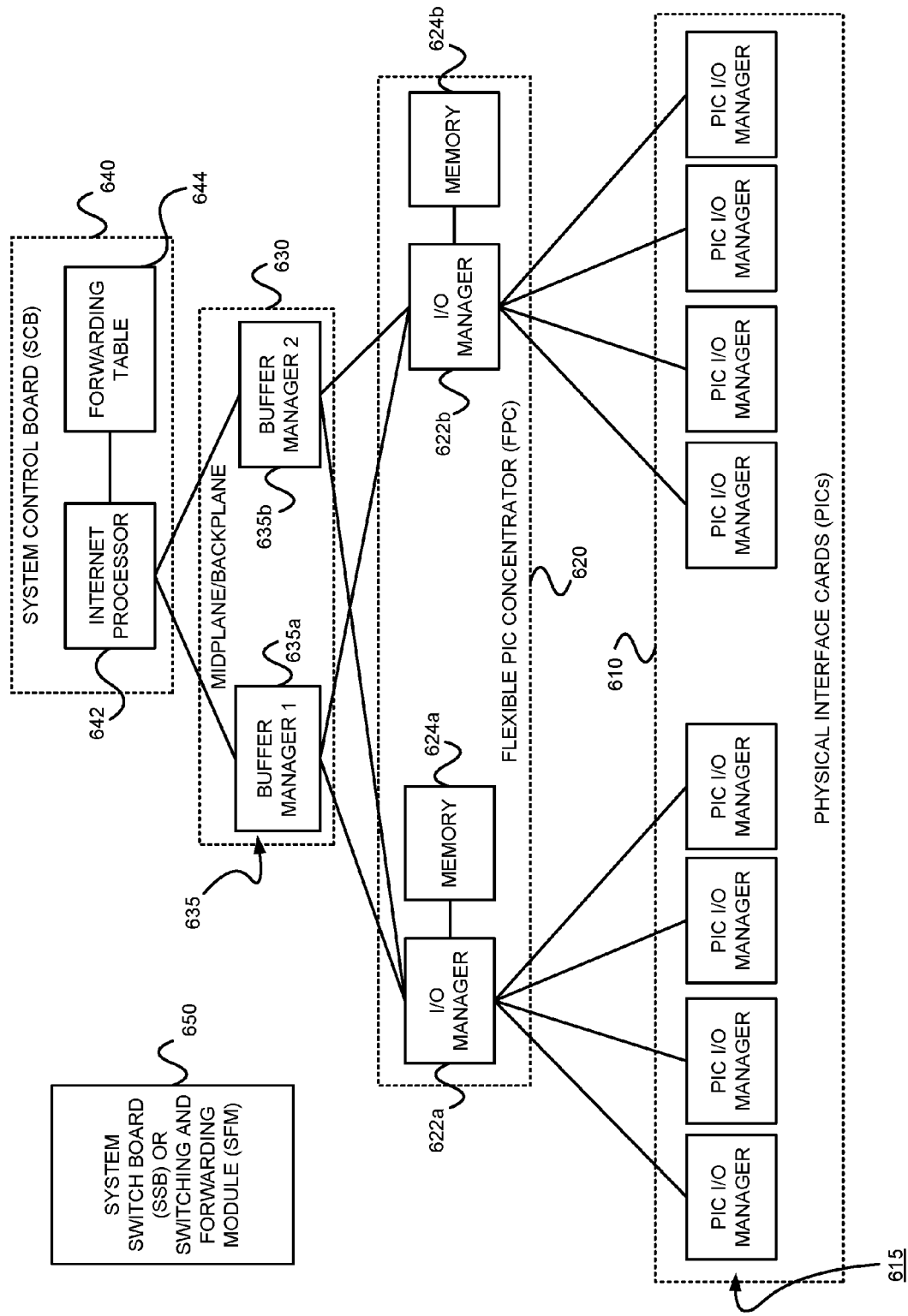

FIG. 6 is a block diagram of example distributed application specific integrated circuits (ASICs) that may be provided in the example router of FIG. 5.

FIGS. 7A and 7B illustrate example packet forwarding operations of the example distributed ASICs of FIG. 6.

Figure 8:
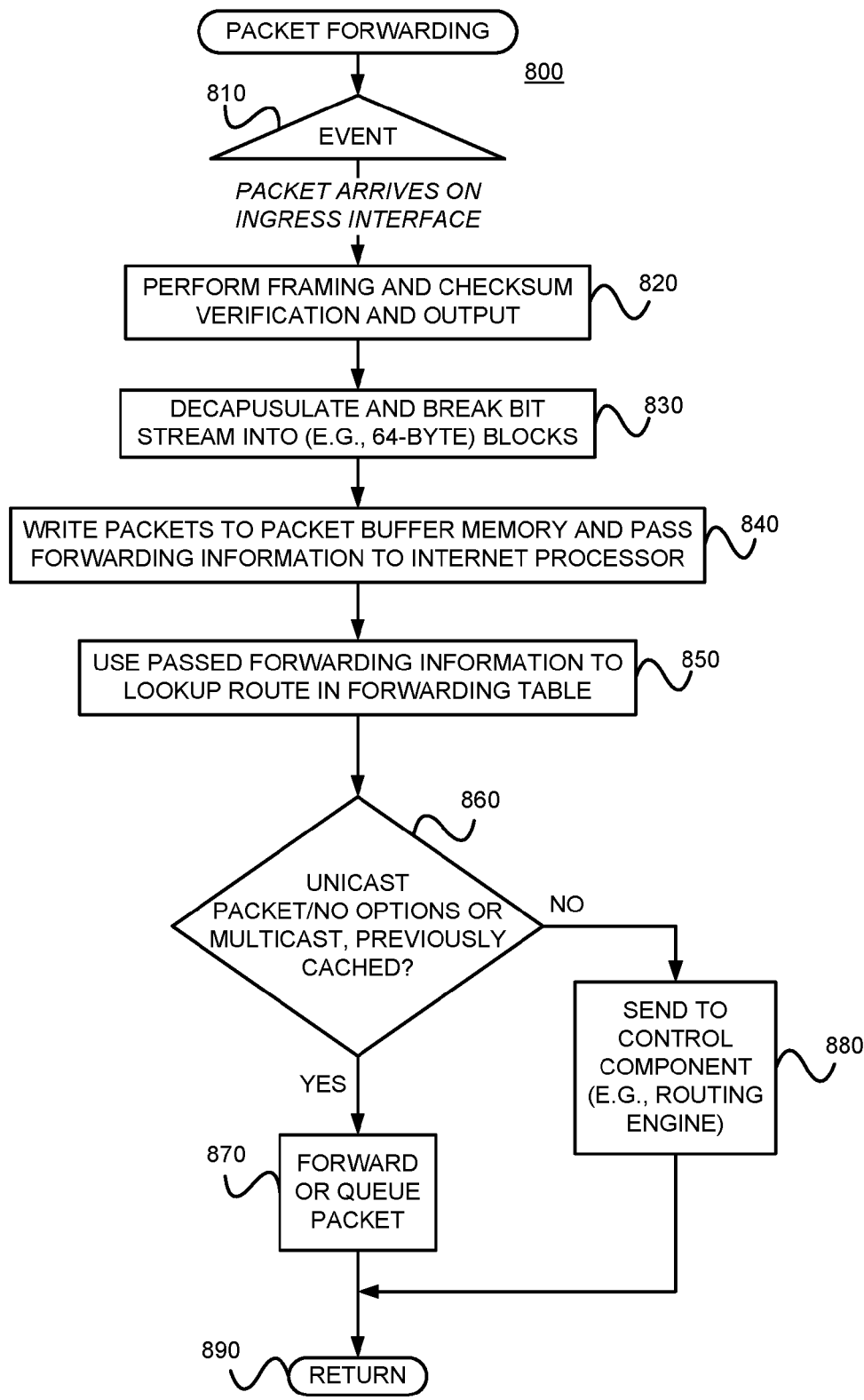

FIG. 8 is a flow diagram of an example packet forwarding method that may be implemented on any of the example routers of FIGS. 5 and 6.

Figure 9:
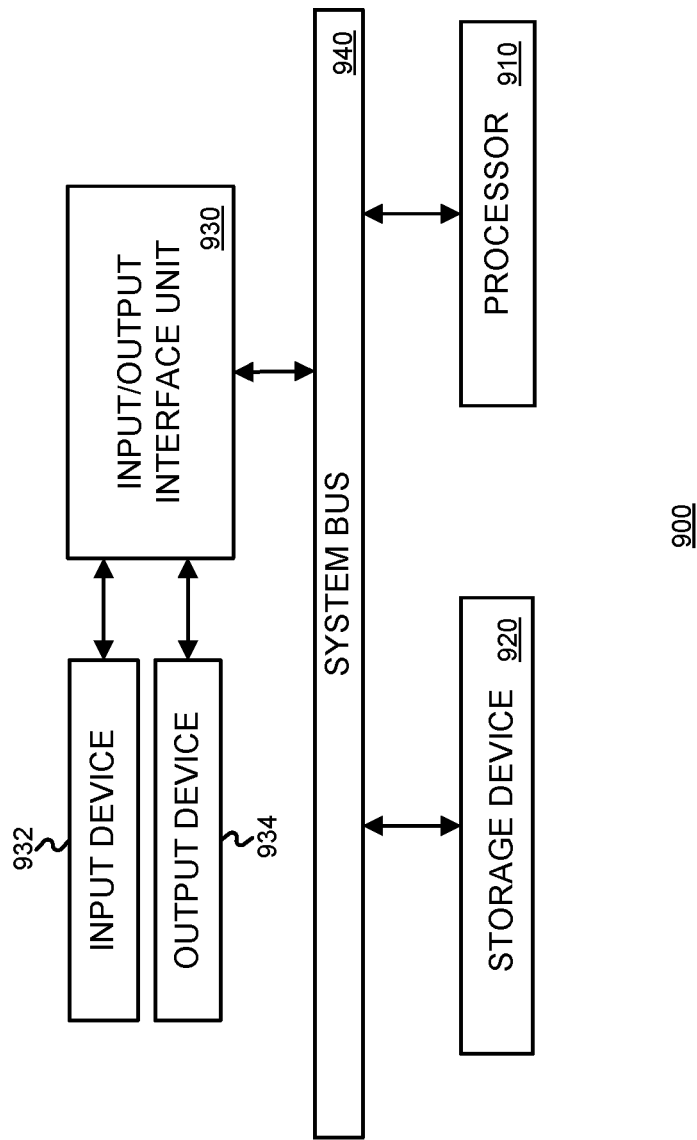

FIG. 9 is a block diagram of an example processor-based system which may be used to execute the example methods for avoiding data traffic loss in an Ethernet Ring that is multihomed, in an active-standby manner, to a VPLS transport network (such as a Border Gateway Protocol (BGP) multihomed Ethernet Ring, an MC-LAG multihomed Ethernet Ring, or some other type of active-standby multihomed Ethernet Ring, etc.) and/or to store information used and/or generated by such example methods.

§ 4. DETAILED DESCRIPTION

The present invention may involve novel methods, apparatus, message formats, and/or data structures for extending Ethernet Ring Protection (ERP) to a an Ethernet Ring that is multihomed, in an active-standby manner, to a VPLS transport network (such as to a Border Gateway Protocol (BGP) multihomed Ethernet Ring, to an MC-LAG multihomed Ethernet Ring, or to some other type of active-standby multihomed Ethernet Ring, etc.) (ring) to avoid traffic loss in the multihomed ring. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Exemplary Environment

Figure 2:
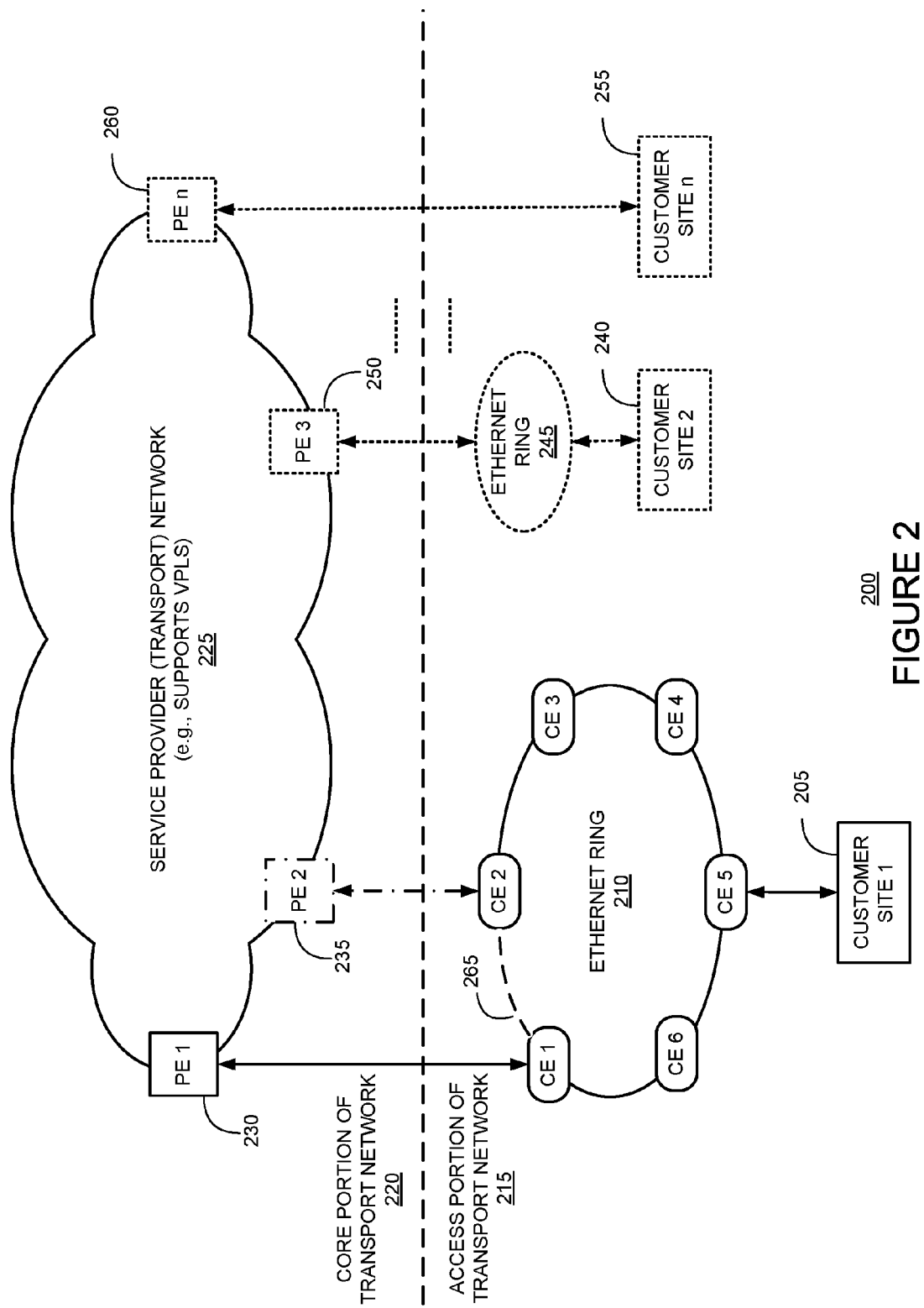
FIG. 2 illustrates an example environment in which the present invention may operate.

FIG. 2 illustrates an example environment 200 in which embodiments consistent with the present invention may operate. As shown, the environment 200 includes an access portion 215 of a transport network and a core portion 220 of the transport network, as well as a customer site 205 accessing the core portion 220 via a multihomed Ethernet Ring 210 in the access portion 215. The multihomed Ethernet Ring 210 is connected to Provider Edge (PE) devices PE 1 230 and PE 2 235. In an example embodiment consistent with the present invention, the devices PE 1 230 and PE 2 235 may be border routers that provide the customer site 205 with access to a service provider network 225. The service provider network 225 may provide a Virtual Private Local area network Service (VPLS). In an example embodiment consistent with the present invention, the border routers PE 1 230 and PE 2 235 may run BGP. (See, e.g., IETF RFC 4271, incorporated herein by reference.) In an example embodiment consistent with the present invention, since the border routers 230 and 235 connected to the Ethernet Ring 210 run BGP, the multihomed Ethernet Ring 210 may also be referred to as a BGP multihomed Ethernet Ring 210. (An Ethernet Ring active-standby multihomed to a VPLS transport network in another way (such as an MC-LAG multihomed Ethernet Ring for example) may be provided instead.) In an example embodiment consistent with the present invention, data packets in the core portion 220 may be routed using at least one of BGP, the Internet Protocol (IP), or Multi Protocol Label Switching (MPLS).

In the environment 200, the border router PE 1 230 may be a designated border router and PE 2 235 may be a standby border router. The customer site 205 obtains access to the service provider network 225 through the designated border router PE 1 230. In an example embodiment consistent with the present invention, if the customer 205 cannot access the service provider network 225 through designated border PE 1 230 (for example, due to a failure of designated border router PE 1 230, or a failure of the link between Ethernet Ring 210 and designated border router PE 1 230, or a failure of the customer device CE 1, etc.), the customer site 205 may gain access to the service provider network 225 through standby border router PE 2 235. Thus, in the example arrangement, the customer site 205 may obtain access to the service provider network 225 either through designated border PE 1 230, or standby border router PE 2 235.

In the environment 200, the multihomed Ethernet Ring 210 includes a plurality of Customer Edge (CE) devices CE 1 to CE 6, as nodes of the Ethernet Ring 210. In an example embodiment consistent with the present invention, each of the CE devices may be a router. The multihomed Ethernet Ring 210 may be connected to two or more border routers of the service provider network 235 via different nodes of the Ethernet Ring 210. In the example environment 200, the multihomed Ethernet Ring 210 is connected to the designated border router PE 1 230 via node CE 1 and to the standby border router PE 2 235 via node CE 2. In the example environment 200, under a normal condition (that is, for example, when all the links and nodes between customer site 205 and PE 1 230 are active and are working), customer site 205 may obtain access to the service provider network 225 through the designated border router PE 1 230 via the node CE 1 of the Ethernet Ring 210. In the example environment 200, under a failure condition (that is, for example, when a link between the Ethernet Ring 210 and designated border router PE 1 230 has failed or when the designated border router PE 1 230 has failed), customer site 205 may obtain access to the service provider network 225 through the standby border router PE 2 235 via the node CE 2 of the Ethernet Ring 210.

Sometimes, in multihomed network sites, a single node may be connected to two or more border routers that provide access to the service provider network. However, in such an architecture, the single node which connects to two or more border routers would act as a single point of failure. That is, if the node which is connecting to two or more border routers fails, access to the service provider network might not be possible through any of the border routers since they are all connected to the failed node. By contrast, in the above exemplary multihomed Ethernet Ring 210, two different nodes of the Ethernet Ring 210 are connected to two or more border routers. For example, node CE 1 is connected to the designated border router PE 1 230, while another node CE 2 is connected to the standby border router PE2 235. Such an architecture of the multihomed Ethernet Ring 210 avoids a situation in which a single node in the ring, connected to two or more border routers, can become a single point of failure.

Naturally, the example environment 200 may also include additional customer sites, "customer site 2" 240 to "customer site n" 255. The customer sites may be connected to a corresponding border router in various ways. For example, in FIG. 2, the customer site 2 240 is connected to the border router PE 3 250 via single homed Ethernet Ring 245, while customer site n 255 is connected to the border router PE n 260 via a direct link. Further, in an example embodiment consistent with the present invention, each of the customer sites may communicate with each other via a VPLS supported by the service provider network 225.

In the exemplary environment 200, the multihomed Ethernet Ring 210 may run the ERP protocol. The ERP protocol, as described above § 1.2.1, protects the ring in case of a link failure in the ring by rerouting data traffic around the failure on the ring. However, the ERP may not protect the ring against failure of links outside of the ring. For example, in the environment 200, the ERP may not protect communications between the multihomed Ethernet Ring 210 and the service provider network 225 if a link between the node CE 1 and designated border router PE1 230 fails (or if one or both of the peer devices fail). Such a scenario might cause data packets sent to the designated border router PE 1 230 to be lost, for example, at node CE 1. More specifically, the ERP running in the Ethernet Ring 210 might not be aware of the failure of the link between the node CE 1 and designated border router PE 1 230 (unless the peer device CE 1 itself fails). Consequently, the Ethernet Ring 210 might continue to forward the data packets to node CE1 (to be transmitted to the designated border router PE1 230).

The above problem of data packet loss may be solved by sending the data packets to the service provider network 225 via the standby border router PE 2 235 instead of the designated border router PE 1 230. The data packets may be sent to the standby router PE 2 235 by rerouting, in the Ethernet Ring 210, the data packets to node CE 2 (which connects to the standby router PE 2 235). In an example Ethernet Ring running ERP, data packets may be rerouted to new nodes by performing an ERP-Media Access Control (MAC) flush. The ERP MAC-flush causes all ring nodes to remove learned layer-2 MAC addresses in their database tables for a changed ring topology and learn new layer-2 MAC addresses of the nodes to which the data packets have to be forwarded. However, in an example Ethernet Ring, the ERP MAC-flush is typically invoked when there is a link failure (or failure recovery) within the ring, but not when the link failure is outside the protected ring. Further, the ERP MAC-flush is invoked as part of protection switching in the Ethernet Ring which also includes activating a Ring Protection Link (RPL) 265 in the ring in order to route data packets around the link failure in the ring. So to reroute the data packets in a scenario where the link failure is outside the Ethernet Ring (for example, between the node CE 1 and designated border router PE 1 230 in the environment 200), the ERP MAC-flush may have to be explicitly invoked in the Ethernet Ring 210, while the RPL 265 remains inactive.

§ 4.2 Example Methods for Avoiding Data Traffic Loss in an Active-Standby, Multihomed Ethernet Ring FIG. 3 is a flow diagram of an example method 300 for avoiding data traffic loss in an Ethernet Ring that is multi-homed, in an active-standby manner, to a VPLS transport network (such as a Border Gateway Protocol (BGP) multi-homed Ethernet Ring, an MC-LAG multihomed Ethernet Ring, or some other type of active-standby multihomed Ethernet Ring, etc.), in a manner consistent with the present invention. The method 300 may be used in an environment such as that 200 described above with reference to FIG. 2. As indicated by event block 305, various actions may be performed in response to various events. For example, if the link between a first node of the Ethernet Ring and a designated border router is active (Event 310), data packets from each of a plurality of nodes of the Ethernet Ring are forwarded to the designated border router via the first node (Block 315) and the method is left (Node 335). Referring back to event block 305, if an indication that the link between the first node of the Ethernet Ring and the designated border router has failed (of if the border router of the service provider network fails) is received (Event 320), an ERP MAC-flush command is invoked, responsive to the received indication, without activating the specified RPL of the Ethernet Ring. (Block 325) Invoking the ERP MAC-flush command causes subsequent data packets from each of the plurality of nodes in the Ethernet Ring to be forwarded to a second node of the Ethernet Ring which is connected to a standby border router. (Block 330) Then, the method is left. (Node 335)

Referring back to block 325, responsive to received indication that the link between the first node of the Ethernet Ring and the designated border router has failed, a message containing instructions to invoke an ERP MAC-flush may be generated. In an exemplary embodiment consistent with the present invention, the ERP MAC-flush command causes each of the plurality of nodes of the Ethernet Ring to (1) remove all the MAC addresses of the nodes corresponding to the previous forwarding route, and (2) store the MAC addresses of the nodes corresponding to the new forwarding path which forwards data packets to the standby designated router via the second node of the Ethernet Ring. Still referring back to block 325, the specified RPL of the Ethernet Ring is not activated when the ERP MAC-flush is invoked (since there is no link failure within the Ethernet Ring).

§ 4.3 Example Apparatus

FIG. 4 illustrates two data forwarding systems 410 and 420 coupled via communications links 430. The links may be physical links or "wireless" links. The data forwarding systems 410,420 may be routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol (RIP) 531, the intermediate system-to-intermediate system protocol (IS-IS) 532, the open shortest path first protocol (OSPF) 533, the enhanced interior gateway routing protocol (EIGRP) 534 and the boarder gateway protocol (BGP) 535, and the label-based forwarding protocol process(es) 540 may support protocols such as BGP 535, the label distribution protocol (LDP) 536 and the resource reservation protocol (RSVP) 537. One or more components (not shown) may permit a user 565 to interact with the user interface process(es) 560. Similarly, one or more components (not shown) may permit an external device to interact with one or more of the router protocol process(es) 530, the label-based forwarding protocol process(es) 540, the interface process(es) 550, and the chassis process(es) 570, via SNMP 585, and such processes may send information to an external device via SNMP 585.

The packet forwarding component 590 may include a microkernel 592, interface process(es) 593, distributed ASICs 594, chassis process(es) 595 and forwarding (e.g., route-based and/or label-based) table(s) 596.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface (API) system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 416 and 426 of FIG. 4.) and encapsulation.

The example control component 510 may provide several ways to manage the router. For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager (HP-NNM), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface (CLI) 560 via a console port, an auxiliary port, and/or a management Ethernet port The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards (PICs) 610, flexible PIC concentrators (FPCs) 620, a midplane or backplane 630, and a system control board(s) 640 (for switching and/or forwarding). Switching fabric is also shown as a system switch board (SSB), or a switching and forwarding module (SFM) 650. Each of the PICs 610 includes one or more PIC I/O managers 615. Each of the FPCs 620 includes one or more I/O managers 622, each with an associated memory 624. The midplane/backplane 630 includes buffer managers 635a, 635b. Finally, the system control board 640 includes an internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,610' contains at least one I/O manager ASIC 615 responsible for media-specific tasks, such as encapsulation. The packets pass through these I/O ASICs on their way into and out of the router. The I/O manager ASIC 615 on the PIC 610,610' is responsible for managing the connection to the I/O manager ASIC 622 on the FPC 620,620', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/642'. The Internet processor 642/642' performs the route lookup using the forwarding table 644 and sends the information over to a second DBM ASIC 635b'. The Internet processor ASIC 642/642' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/620' (or multiple egress FPCs, in the case of multicast) for reassembly. (Thus, the DBM ASICs 635a' and 635b' are responsible for managing the packet memory 624 distributed across all FPCs 620/620', extracting forwarding-related information from packets, and instructing the FPC where to forward packets.)

The I/O manager ASIC 622 on the egress FPC 620/620' may perform some value-added services. In addition to incrementing time to live (TTL) values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/620' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present invention may be implemented on the example routers of FIG. 4 or 5, embodiments consistent with the present invention may be implemented on communications network nodes (e.g., routers, switches, etc.) having different architectures. More generally, embodiments consistent with the present invention may be implemented on an example system 900 as illustrated on FIG. 9.

FIG. 9 is a block diagram of an exemplary machine 900 that may perform one or more of the processes described, and/or store information used and/or generated by such processes. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components of the invention.

In some embodiments consistent with the present invention, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Illustrative Examples of Operations

An example illustrating operations of an example method of avoiding data traffic loss in a multihomed Ethernet Ring is now described with reference to FIG. 2. In the example environment 200, when the link between a designated border router PE 1 230 and a first node CE 1 of Ethernet Ring 210 is active, all data packets from each of the nodes CE2-CE6 of the Ethernet Ring destined for transport via the VPLS 225 may be routed to the designated border router PE 1 230 via the first node CE 1. (Recall, e.g., 310 and 315 of FIG. 3.) Thus, in such a case, information from the customer site 1 205 to an ingress point of the service provider network 225 would normally proceed as follows: CE 5→CE 6→CE 1→PE 1. In the example environment 200, if a link between the node CE 1 of Ethernet Ring 210 and designated border router PE 1 230 fails, an indication that the link has failed may be received. (Recall, e.g., 320 of FIG. 3.) Each type of active-standby multihoming technique has its own signaling mechanism to communicate such a failure. For example, in case of BGP multihoming, the failure indication is communicated between the multihomed PEs using a BGP message. As another example, in case of MC-LAG multihoming, the failure indication is communicated using Inter Chassis Communication Protocol (ICCP) signaling.

Responsive to the received indication that the link between the node CE 1 and designated border router PE 1 230 has failed, an ERP MAC-flush is invoked without activating the RPL 265 of the Ethernet Ring 210. (Recall, e.g., 325 of FIG. 3.) The ERP MAC-flush command causes each of the nodes CE1-CE6 in the Ethernet Ring 210 to remove (all) previously learned MAC addresses from their database tables and learn the MAC addresses of the nodes along the new forwarding routes/paths. In the exemplary environment 200, the new forwarding route in the Ethernet Ring includes a path/route forwarding data packets via the standby border router PE 2 235 via node CE 2 of the Ethernet Ring 210. The subsequent data packets from each of the nodes CE1-CE6 destined for transport via VPLS 225 are forwarded to the standby border router PE 2 235 via node CE 2 of the Ethernet Ring 210. (Recall, e.g., 330 of FIG. 3.) Thus, in such a case, information from the customer site 1 205 to an ingress point of the service provider network 225 would proceed as follows: CE 5->CE 4->CE 3->CE 2->PE 2.

In an exemplary embodiment consistent with the present invention, if the link between the node CE 1 of Ethernet Ring 210 and designated border router PE 1 230 recovers from failure, the ERP MAC-flush is invoked again which causes each of the nodes CE1-CE6 to remove the MAC address of the nodes along a new forwarding path/rout and revert to the MAC address of the nodes along the previous forwarding path/route, which includes the route to the designated border router PE 1 230 via node CE 1.

§ 4.5 Conclusion

As can be appreciated from the foregoing, exemplary embodiments consistent with the present invention provide methods and apparatus for avoiding data traffic loss in an Ethernet Ring that is multihomed, in an active-standby manner, to a VPLS transport network (such as a Border Gateway Protocol (BGP) multihomed Ethernet Ring, an MC-LAG multihomed Ethernet Ring, or some other type of active-standby multihomed Ethernet Ring, etc.). The exemplary methods (i) extend ERP functionality to multihomed Ethernet Rings, (ii) do not interfere with or require any change in the existing ERP mechanisms, (iii) do not require any special knowledge of the (e.g., BGP or MC-LAG) multihoming configuration, (iv) do not require any change in VPLS multihoming techniques, and (v) provide full redundancy in both the Ethernet Ring and the core portion of the transport network in the multihomed Ethernet Rings.

What is claimed is:

1. A computer-implemented method for avoiding traffic loss in an active-standby, multihomed Ring running a ring protection (RP) protocol including a specified ring protection link (RPL), in which a first node of the Ring in a first portion of a network is linked with a designated router of a second portion of the network and in which a second node of the Ring in the first portion of the network is linked with a standby router of the second portion of the network, the computer-implemented method comprising:

a) receiving, while the Ring running the ring protection protocol has no failures and the specified RPL of the Ring is in an inactive or blocked state to prevent data traffic looping within the Ring, an indication that communications between the first node and the designated router of the network have failed, wherein the designated router is not a part of the Ring running the RP protocol; and b) responsive to the received indication that communications between the first node and the designated router of the network have failed,
  1) invoking a Layer 2 address flush in the Ring, regardless of the presence or absence of a failed link in the Ring, and 2) maintaining the specified RPL of the Ring in an inactive or blocked state.

2. The computer-implemented method of claim 1, wherein the Layer 2 address flush causes data packets from each of the plurality of nodes in the Ring to be forwarded to the standby router via the second node.

3. The computer-implemented method of claim 2, wherein the data packets are forwarded in the Ring using a layer 2 destination address within each packet.

4. The computer-implemented method of claim 1, wherein each of the plurality of nodes in the Ring is a router, and
wherein the act of invoking the Layer 2 address flush in the Ring removes learned Layer 2 addresses from a database of each of the routers.

5. The computer-implemented method of claim 1, wherein the first portion of the network is an access portion of a transport network.

6. The computer-implemented method of claim 5, wherein the second portion of the network is a core portion of the transport network.

7. The computer-implemented method of claim 1, wherein the Ring is a layer 2 ring.

8. The computer-implemented method of claim 6, wherein the core portion of the transport network provides a Virtual Private Local Area Network Service (VPLS) to a customer that accesses the access network via the Ring.

9. The computer-implemented method of claim 6, wherein the core portion of the transport network routes data packets using at least one of (a) Internet Protocol (IP), (b) a border gateway protocol (BGP) and (c) Multi Protocol Label Switching (MPLS).

10. The computer-implemented method of claim 1, further comprising:
c) receiving an indication that a link within the Ring has failed; and
d) responsive to the received indication that the link within the Ring has failed,
1) invoking a Layer 2 address flush in the Ring, and
2) activating the specified RPL of the Ring.

11. A computer-implemented method for avoiding traffic loss in an active-standby, multihomed Ring running a ring protection (RP) protocol including a specified ring protection link (RPL), in which a first node of the Ring in a first portion of a network is linked with a designated router of a second portion of the network and in which a second node of the Ring in the first portion of the network is linked with a standby router of the second portion of the network, the computer-implemented method comprising:
a) routing data packets from each of a plurality of nodes in the Ring to the designated router via the first node when a link between the first node and the designated router has not failed;
b) receiving, while the Ring running the ring protection protocol has no failures and the specified RPL of the Ring is in an inactive or blocked state to prevent data traffic looping within the Ring, an indication that communications between the first node and the designated router have failed, wherein the designated router is not a part of the Ring running the RP protocol; and
c) responsive to the received indication that communications between the first node and the designated router have failed,
1) invoking a Layer 2 address flush in the Ring, regardless of the presence or absence of a failed link in the Ring, and
2) maintaining the specified RPL of the Ring in an inactive or blocked state, wherein the Layer 2 address flush causes subsequent data packets from each of the plurality of nodes in the Ring to be forwarded to the standby router via the second node.

12. The computer-implemented method of claim 11, further comprising:
d) receiving an indication that a link within the Ring has failed; and
e) responsive to the received indication that the link within the Ring has failed,
1) invoking a Layer 2 address flush in the Ring, and
2) activating the specified RPL of the Ring.

13. Apparatus comprising:
a) at least one processor;
b) at least one input device; and
c) at least one storage device storing program instructions which, when executed by the at least one processor, performs a method for avoiding traffic loss in an active-standby, multihomed Ring running a ring protection (RP) protocol including a specified ring protection link (RPL), in which a first node of the Ring in a first portion of a network is linked with a designated router of a second portion of the network and in which a second node of the Ring in the first portion of the network is linked with a standby router of the second portion of the network, the method including:
1) receiving, while the Ring running the ring protection protocol has no failures and the specified RPL of the Ring is in an inactive or blocked state to prevent data traffic looping within the Ring, an indication that communications between the first node and the designated router have failed, wherein the designated router is not a part of the Ring running the RP protocol; and
2) responsive to the received indication that communications between the first node and the designated router have failed,
A) invoking a Layer 2 address flush in the Ring, regardless of the presence or absence of a failed link in the Ring, and
B) maintaining the specified RPL of the Ring in an inactive or blocked state.

14. The apparatus of claim 13, wherein the Layer 2 address flush causes data packets from each of the plurality of nodes in the Ring to be forwarded to the standby router via the second node.

15. The apparatus of claim 14, wherein each of the data packets is forwarded in the Ring using a layer-2 destination address of the data packet.

16. The apparatus of claim 13, wherein each of the plurality of nodes in the Ring is a router, and
wherein the act of invoking a Layer 2 address flush in the Ring removes learned Layer 2 addresses from a database of each of the routers.

17. The apparatus of claim 13, wherein the first portion of the network is an access portion of a transport network.

18. The apparatus of claim 17, wherein the second portion of the network is a core portion of the transport network.

19. The apparatus of claim 13, wherein the Ring is a layer 2 ring.

20. The apparatus of claim 18, wherein the core portion of the transport network provides a Virtual Private Local Area Network Service (VPLS) to a customer that accesses the access network via the Ring.

21. The apparatus of claim 18, wherein the core portion of the transport network routes data packets using at least one of (a) Internet Protocol (IP), (b) a border gateway protocol (BGP) and (c) Multi Protocol Label Switching (MPLS).

* * * * *